(12) United States Patent
Chrapek et al.

(10) Patent No.: US 12,306,767 B2
(45) Date of Patent: May 20, 2025

(54) DATA TRANSFER ENCRYPTION MECHANISM

(71) Applicant: Intel Corporation, Santa Clara, CA (US)

(72) Inventors: Marcin Andrzej Chrapek, Zurich (CH); Reshma Lal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 204 days.

(21) Appl. No.: 17/968,989

(22) Filed: Oct. 19, 2022

(65) Prior Publication Data

US 2024/0134804 A1 Apr. 25, 2024
US 2024/0232097 A9 Jul. 11, 2024

(51) Int. Cl.
*G06F 12/1027* (2016.01)
*G06F 12/0882* (2016.01)
*G06F 12/14* (2006.01)

(52) U.S. Cl.
CPC ...... *G06F 12/1027* (2013.01); *G06F 12/0882* (2013.01); *G06F 12/1408* (2013.01)

(58) Field of Classification Search
CPC ............. G06F 12/1027; G06F 12/0882; G06F 12/1408
See application file for complete search history.

(56) References Cited

U.S. PATENT DOCUMENTS

| | | | | |
|---|---|---|---|---|
| 2008/0114994 | A1* | 5/2008 | Iyer | G06F 12/1408 713/193 |
| 2009/0048976 | A1* | 2/2009 | Hars | G06F 12/1408 705/50 |
| 2011/0085657 | A1* | 4/2011 | Matthews, Jr. | G06F 12/1408 380/28 |
| 2013/0168450 | A1* | 7/2013 | von Mueller | H04L 9/0618 235/449 |
| 2015/0356024 | A1* | 12/2015 | Loh | G06F 12/1027 711/113 |
| 2016/0124716 | A1* | 5/2016 | Venkata | G06F 7/58 708/250 |
| 2016/0371198 | A1* | 12/2016 | Cui | G06F 12/1027 |
| 2019/0108134 | A1* | 4/2019 | Cai | G06F 12/1027 |
| 2020/0374120 | A1* | 11/2020 | Stanley | H04L 9/0643 |
| 2021/0126770 | A1* | 4/2021 | Moon | H04L 9/0631 |
| 2022/0066950 | A1* | 3/2022 | Wang | G06F 12/1408 |
| 2022/0198027 | A1* | 6/2022 | Chhabra | G06F 21/74 |

OTHER PUBLICATIONS

Aumasson, Serious Cryptography, 2018, William Pollock, pages: Cover, [8], 17 and 18. (Year: 2018).*

* cited by examiner

*Primary Examiner* — Richard G Keehn
(74) *Attorney, Agent, or Firm* — Jaffery Watson Hamilton & DeSanctis LLP

(57) ABSTRACT

An apparatus comprising translator circuitry to receive a plurality of physical addresses of memory data, determine an offset associated with each of the physical page addresses and apply a tweak seed to each offset to generate a plurality of tweaks.

20 Claims, 11 Drawing Sheets

DATA TRANSFER ENCRYPTION MECHANISM

BACKGROUND

Applications are increasingly running on public cloud datacenters, which comprises multiple platforms and devices connected in a network. Maintaining data confidentiality during the transport of data between platforms is important to maintain datacenter security.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
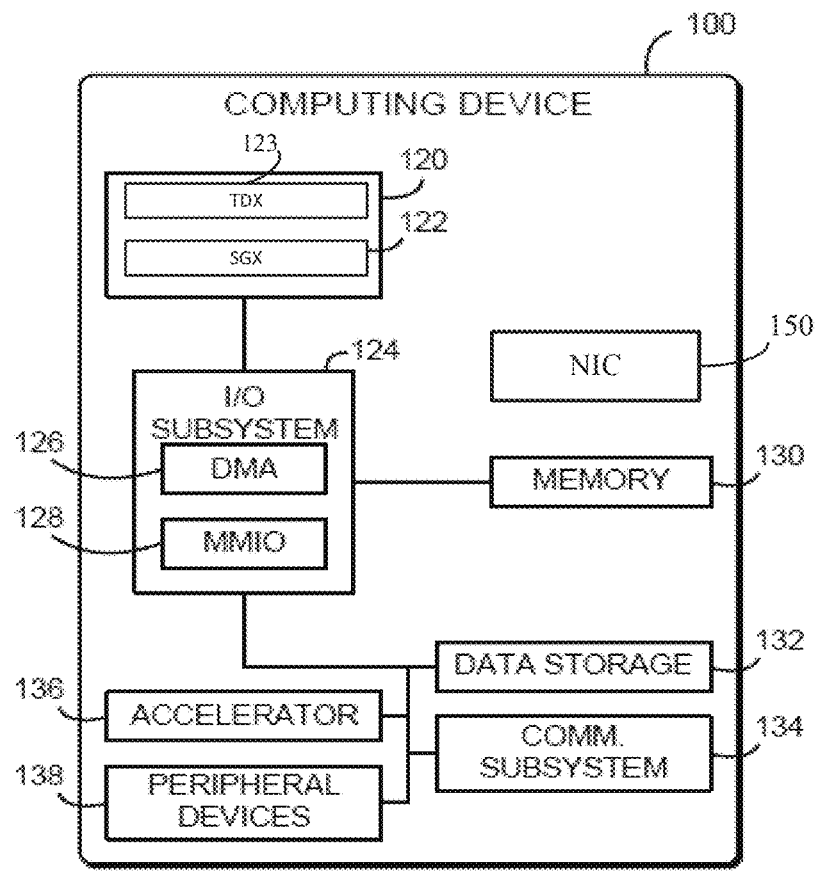
FIG. 1 is a simplified block diagram of at least one embodiment of a computing device for secure I/O with an accelerator device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing device 100 for secure I/O with an accelerator device includes a processor 120 and an accelerator device (or accelerator) 136, such as a field-programmable gate array (FPGA). In use, as described further below, a trusted execution environment (TEE) established by the processor 120 securely communicates data with the accelerator 136. Data may be transferred using memory-mapped I/O (MMIO) transactions or direct memory access (DMA) transactions. For example, the TEE may perform an MMIO write transaction that includes encrypted data, and the accelerator 136 decrypts the data and performs the write. As another example, the TEE may perform an MMIO read request transaction, and the accelerator 136 may read the requested data, encrypt the data, and perform an MMIO read response transaction that includes the encrypted data. As yet another example, the TEE may configure the accelerator 136 to perform a DMA operation, and the accelerator 136 performs a memory transfer, performs a cryptographic operation (i.e., encryption or decryption), and forwards the result. As described further below, the TEE and the accelerator 136 generate authentication tags (ATs) for the transferred data and may use those ATs to validate the transactions. The computing device 100 may thus keep untrusted software of the computing device 100, such as the operating system or virtual machine monitor, outside of the trusted code base (TCB) of the TEE and the accelerator 136. Thus, the computing device 100 may secure data exchanged or otherwise processed by a TEE and an accelerator 136 from an owner of the computing device 100 (e.g., a cloud service provider) or other tenants of the computing device 100. Accordingly, the computing device 100 may improve security and performance for multi-tenant environments by allowing secure use of accelerator devices.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 124, a memory 130, and a data storage device 132. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, which allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 130. The secure enclave support 122 may be embodied as a set of processor instruction extensions that allows the processor 120 to establish one or more secure enclaves in the memory 130. For example, the secure enclave support 122 may be embodied as Intel® Software Guard Extensions (SGX) technology. In other embodiments, processor 120 may include trusted domains (TDs) 123 embodied as Intel® Trusted Domain Extensions (TDX) technology that is implemented to isolate virtual machines from the virtual machine monitor and other virtual machines operating on the computing device 100.

The memory 130 may be embodied as any type of volatile or non-volatile memory or data storage capable of performing the functions described herein. In operation, the memory 130 may store various data and software used during operation of the computing device 100 such as operating systems, applications, programs, libraries, and drivers. As shown, the memory 130 may be communicatively coupled to the processor 120 via the I/O subsystem 124, which may be embodied as circuitry and/or components to facilitate input/output operations with the processor 120, the memory 130, and other components of the computing device 100. For example, the I/O subsystem 124 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 130 may be directly coupled to the processor 120, for example via an integrated memory controller hub. Additionally, in some embodiments, the I/O subsystem 124 may form a portion of a system-on-a-chip (SoC) and be incorporated, along with the processor 120, the memory 130, the accelerator 136, and/or other components of the computing device 100, on a single integrated circuit chip. Additionally, or alternatively, in some embodiments the processor 120 may include an integrated memory controller and a system agent, which may be embodied as a logic block in which data traffic from processor cores and I/O devices converges before being sent to the memory 130.

As shown, the I/O subsystem 124 includes a direct memory access (DMA) engine 126 and a memory-mapped I/O (MMIO) engine 128. The processor 120, including secure enclaves established with the secure enclave support 122, may communicate with the accelerator 136 with one or more DMA transactions using the DMA engine 126 and/or with one or more MMIO transactions using the MMIO engine 128. The computing device 100 may include multiple DMA engines 126 and/or MMIO engines 128 for handling DMA and MMIO read/write transactions based on bandwidth between the processor 120 and the accelerator 136. Although illustrated as being included in the I/O subsystem 124, it should be understood that in some embodiments the DMA engine 126 and/or the MMIO engine 128 may be included in other components of the computing device 100 (e.g., the processor 120, memory controller, or system agent), or in some embodiments may be embodied as separate components.

The data storage device 132 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 134, which may be embodied as any communication circuit, device, or collection thereof, capable of enabling communications between the computing device 100 and other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The accelerator 136 may be embodied as a field-programmable gate array (FPGA), an application-specific integrated circuit (ASIC), a coprocessor, or other digital logic device capable of performing accelerated functions (e.g., accelerated application functions, accelerated network functions, or other accelerated functions), GPUs, etc. Illustratively, the accelerator 136 is an FPGA, which may be embodied as an integrated circuit including programmable digital logic resources that may be configured after manufacture. The FPGA may include, for example, a configurable array of logic blocks in communication over a configurable data interchange. The accelerator 136 may be coupled to the processor 120 via a high-speed connection interface such as a peripheral bus (e.g., a PCI Express bus) or an inter-processor interconnect (e.g., an in-die interconnect (IDI) or QuickPath Interconnect (QPI)), or via any other appropriate interconnect. The accelerator 136 may receive data and/or commands for processing from the processor 120 and return results data to the processor 120 via DMA, MMIO, or other data transfer transactions.

As shown, the computing device 100 may further include one or more peripheral devices 138. The peripheral devices 138 may include any number of additional input/output devices, interface devices, hardware accelerators, and/or other peripheral devices. For example, in some embodiments, the peripheral devices 138 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

The computing device 100 may also include a network interface controller (NIC) 150. NIC 150 enables computing device 100 to communicate with another computing device 100 via a network. In embodiments, NIC 150 may comprise a programmable (or smart) NIC, infrastructure processing unit (IPU), or datacenter processing unit (DPU) that may be configured to perform different actions based on a type of packet, connection, or other packet characteristic.

Figure 2:
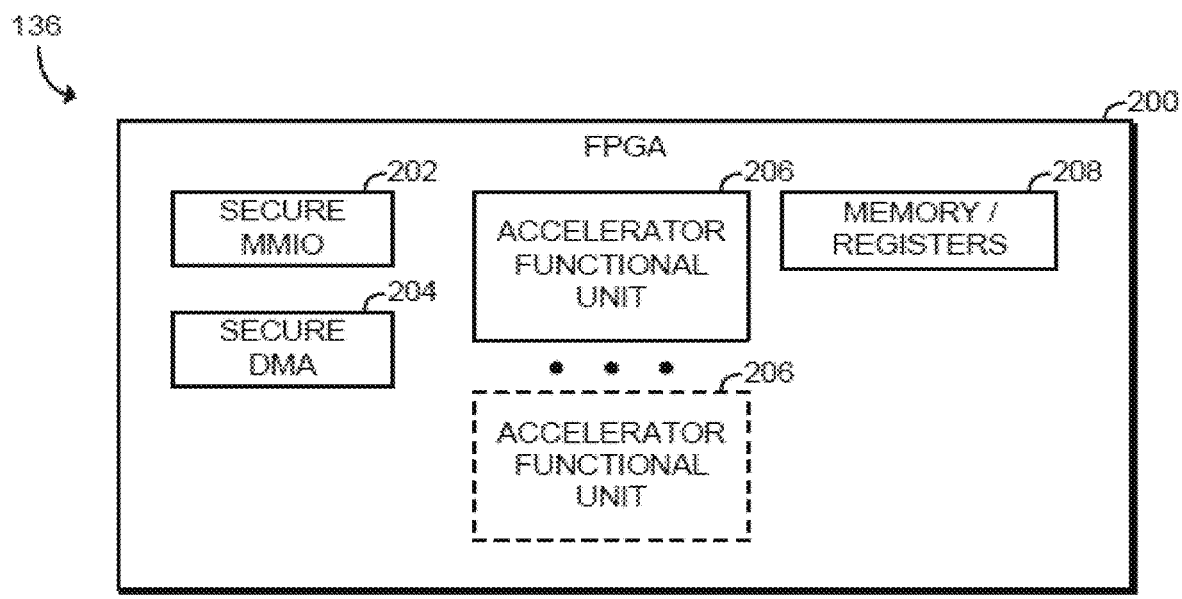
FIG. 2 is a simplified block diagram of at least one embodiment of an accelerator device of the computing device of FIG. 1.

Referring now to FIG. 2, an illustrative embodiment of a field-programmable gate array (FPGA) 200 is shown. As shown, the FPGA 200 is one potential embodiment of an accelerator 136. The illustratively FPGA 200 includes a secure MMIO engine 202, a secure DMA engine 204, one or more accelerator functional units (AFUs) 206, and memory/registers 208. As described further below, the secure MMIO engine 202 and the secure DMA engine 204 perform in-line authenticated cryptographic operations on data transferred between the processor 120 (e.g., a secure enclave established by the processor) and the FPGA 200 (e.g., one or more AFUs 206). In some embodiments, the secure MMIO engine 202 and/or the secure DMA engine 204 may intercept, filter, or otherwise process data traffic on one or more cache-coherent interconnects, internal buses, or other interconnects of the FPGA 200.

Each AFU 206 may be embodied as logic resources of the FPGA 200 that are configured to perform an acceleration task. Each AFU 206 may be associated with an application executed by the computing device 100 in a secure enclave or other trusted execution environment. Each AFU 206 may be configured or otherwise supplied by a tenant or other user of the computing device 100. For example, each AFU 206 may correspond to a bitstream image programmed to the FPGA 200. As described further below, data processed by each AFU 206, including data exchanged with the trusted execution environment, may be cryptographically protected from untrusted components of the computing device 100 (e.g., protected from software outside of the trusted code base of the tenant enclave). Each AFU 206 may access or otherwise process stored in the memory/registers 208, which may be embodied as internal registers, cache, SRAM, storage, or other memory of the FPGA 200. In some embodiments, the memory/registers 208 may also include external DRAM or other dedicated memory coupled to the FPGA 200.

Figure 3:
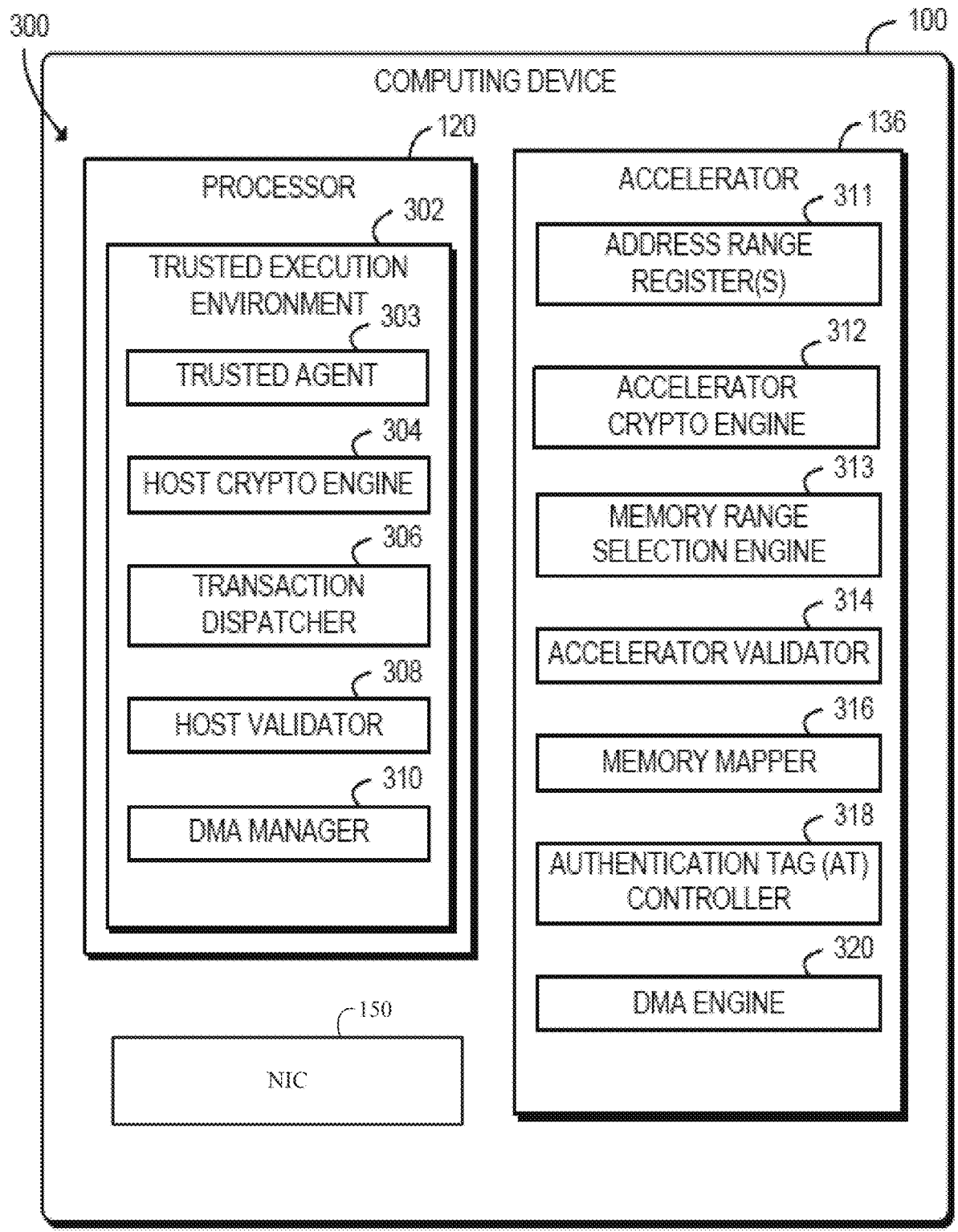
FIG. 3 is a simplified block diagram of at least one embodiment of an environment of the computing device of FIGS. 1 and 2.

Referring now to FIG. 3, in an illustrative embodiment, the computing device 100 establishes an environment 300 during operation. The illustrative environment 300 includes a trusted execution environment (TEE) 302 and the accelerator 136. The TEE 302 further includes a trusted agent 303, host cryptographic engine 304, a transaction dispatcher 306, a host validator 308, and a direct memory access (DMA) manager 310. The accelerator 136 includes an accelerator cryptographic engine 312, a memory range selection engine 313, an accelerator validator 314, a memory mapper 316, an authentication tag (AT) controller 318, and a DMA engine 320. The various components of the environment 300 may be embodied as hardware, firmware, software, or a combination thereof. As such, in some embodiments, one or more of the components of the environment 300 may be embodied as circuitry or collection of electrical devices (e.g., host cryptographic engine circuitry 304, transaction dispatcher circuitry 306, host validator circuitry 308, DMA manager circuitry 310, accelerator cryptographic engine circuitry 312, accelerator validator circuitry 314, memory mapper circuitry 316, AT controller circuitry 318, and/or DMA engine circuitry 320). It should be appreciated that, in such embodiments, one or more of the host cryptographic engine circuitry 304, the transaction dispatcher circuitry 306, the host validator circuitry 308, the DMA manager circuitry 310, the accelerator cryptographic engine circuitry 312, the accelerator validator circuitry 314, the memory mapper circuitry 316, the AT controller circuitry 318, and/or the DMA engine circuitry 320 may form a portion of the processor 120, the I/O subsystem 124, the accelerator 136, and/or other components of the computing device 100. Additionally, in some embodiments, one or more of the illustrative components may form a portion of another component and/or one or more of the illustrative components may be independent of one another.

The TEE 302 may be embodied as a trusted execution environment of the computing device 100 that is authenticated and protected from unauthorized access using hardware support of the computing device 100, such as the secure enclave support 122 of the processor 120. Illustratively, the TEE 302 may be embodied as one or more secure enclaves established using Intel® SGX technology or TDs established using Intel® TDX technology. The TEE 302 may also include or otherwise interface with one or more drivers, libraries, or other components of the computing device 100 to interface with the accelerator 136.

The host cryptographic engine 304 is configured to generate an authentication tag (AT) based on a memory-mapped I/O (MMIO) transaction and to write that AT to an AT register of the accelerator 136. For an MMIO write request, the host cryptographic engine 304 is further configured to encrypt a data item to generate an encrypted data item, and the AT is generated in response to encrypting the data item. For an MMIO read request, the AT is generated based on an address associated with MMIO read request.

The transaction dispatcher 306 is configured to dispatch the memory-mapped I/O transaction (e.g., an MMIO write request or an MMIO read request) to the accelerator 136 after writing the calculated AT to the AT register. An MMIO write request may be dispatched with the encrypted data item.

The host validator 308 may be configured to verify that an MMIO write request succeeded in response dispatching the MMIO write request. Verifying that the MMIO write request succeeded may include securely reading a status register of the accelerator 136, securely reading a value at the address of the MMIO write from the accelerator 136, or reading an AT register of the accelerator 136 that returns an AT value calculated by the accelerator 136, as described below. For MMIO read requests, the host validator 308 may be further configured to generate an AT based on an encrypted data item included in a MMIO read response dispatched from the accelerator 136; read a reported AT from a register of the accelerator 136; and determine whether the AT generated by the TEE 302 matches the AT reported by the accelerator 136. The host validator 308 may be further configured to indicate an error if those ATs do not match, which provides assurance that data was not modified on the way from the TEE 302 to the accelerator 136.

The accelerator cryptographic engine 312 is configured to perform a cryptographic operation associated with the MMIO transaction and to generate an AT based on the MMIO transaction in response to the MMIO transaction being dispatched. For an MMIO write request, the cryptographic operation includes decrypting an encrypted data item received from the TEE 302 to generate a data item, and the AT is generated based on the encrypted data item. For an MMIO read request, the cryptographic operation includes encrypting a data item from a memory of the accelerator 136 to generate an encrypted data item, and the AT is generated based on that encrypted data item.

The accelerator validator 314 is configured to determine whether the AT written by the TEE 302 matches the AT determined by the accelerator 136. The accelerator validator 314 is further configured to drop the MMIO transaction if those ATs do not match. For MMIO read requests, the accelerator validator 314 may be configured to generate a poisoned AT in response to dropping the MMIO read request, and may be further configured to dispatch a MMIO read response with a poisoned data item to the TEE 302 in response to dropping the MMIO read request.

The memory mapper 316 is configured to commit the MMIO transaction in response to determining that the AT written by the TEE 302 matches the AT generated by the accelerator 136. For an MMIO write request, committing the transaction may include storing the data item in a memory of the accelerator 136. The memory mapper 316 may be further configured to set a status register to indicate success in response to storing the data item. For an MMIO read request, committing the transaction may include reading the data item at the address in the memory of the accelerator 136 and dispatching an MMIO read response with the encrypted data item to the TEE 302.

The DMA manager 310 is configured to securely write an initialization command to the accelerator 136 to initialize a secure DMA transfer. The DMA manager 310 is further configured to securely configure a descriptor indicative of a host memory buffer, an accelerator 136 buffer, and a transfer direction. The transfer direction may be host to accelerator 136 or accelerator 136 to host. The DMA manager 310 is further configured to securely write a finalization command to the accelerator 136 to finalize an authentication tag (AT) for the secure DMA transfer. The initialization command, the descriptor, and the finalization command may each be securely written and/or configured with an MMIO write request. The DMA manager 310 may be further configured to determine whether to transfer additional data in response to securely configuring the descriptor, the finalization command may be securely written in response to determining that no additional data remains for transfer.

The AT controller 318 is configured to initialize an AT in response to the initialization command from the TEE 302. The AT controller 318 is further configured to finalize the AT in response to the finalization command from the TEE 302.

The DMA engine 320 is configured to transfer data between the host memory buffer and the accelerator 136 buffer in response to the descriptor from the TEE 302. For a transfer from host to accelerator 136, transferring the data includes copying encrypted data from the host memory buffer and forwarding the plaintext data to the accelerator 136 buffer in response to decrypting the encrypted data. For a transfer from accelerator 136 to host, transferring the data includes copying plaintext data from the accelerator 136 buffer and forwarding encrypted data to the host memory buffer in response encrypting the plaintext data.

The accelerator cryptographic engine 312 is configured to perform a cryptographic operation with the data in response to transferring the data and to update the AT in response to transferring the data. For a transfer from host to accelerator 136, performing the cryptographic operation includes decrypting encrypted data to generate plaintext data. For a transfer from accelerator 136 to host, performing the cryptographic operation includes encrypting plaintext data to generate encrypted data.

The host validator 308 is configured to determine an expected AT based on the secure DMA transfer, to read the AT from the accelerator 136 in response to securely writing the finalization command, and to determine whether the AT from the accelerator 136 matches the expected AT. The host validator 308 may be further configured to indicate success if the ATs match and to indicate failure if the ATs do not match.

According to one embodiment, NIC 150 may comprise an accelerator 136. In such an embodiment, NIC 150 operates as a network interface accelerator/controller.

Figure 4:
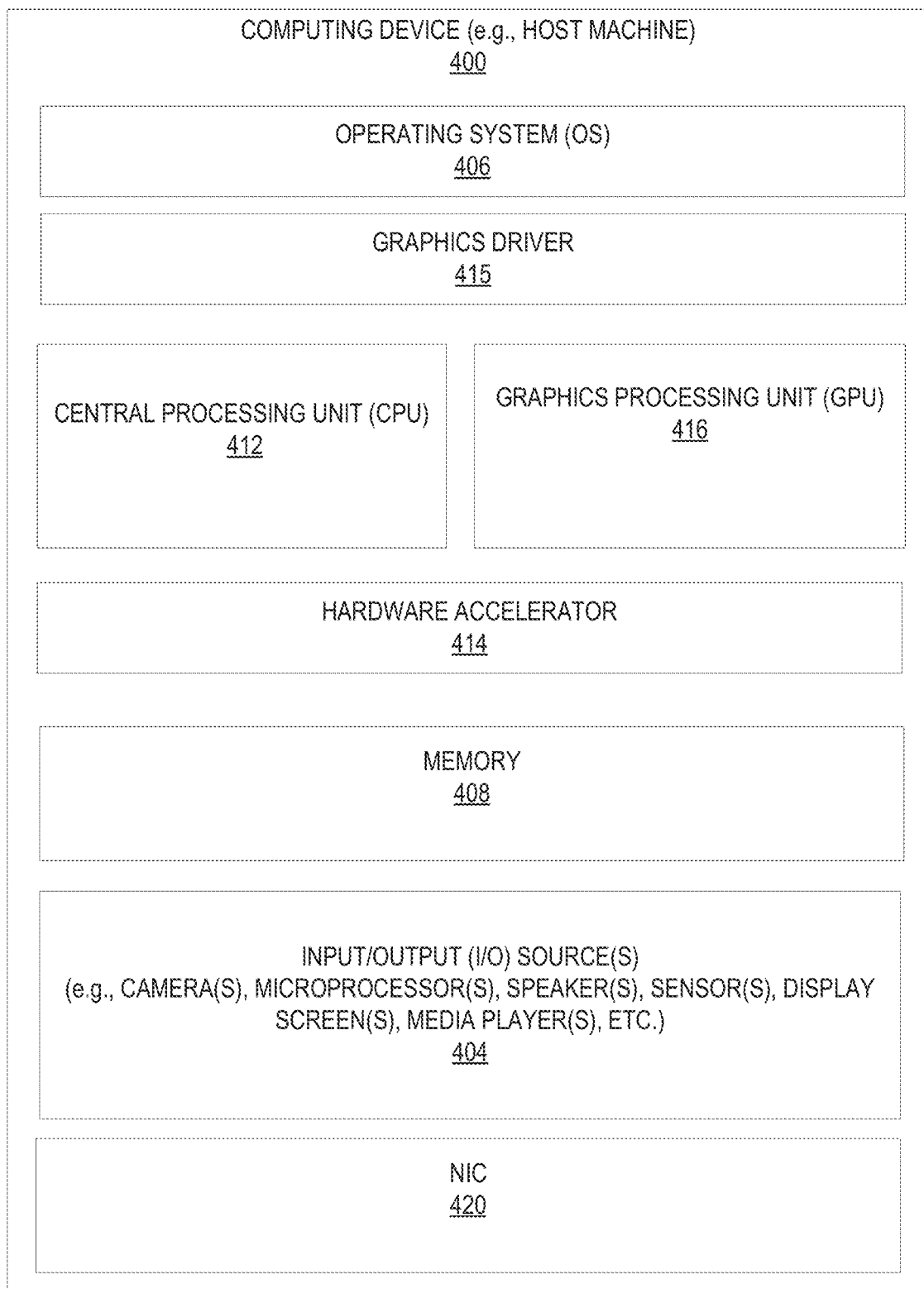
FIG. 4 illustrates a computing device according to implementations of the disclosure.

FIG. 4 illustrates another embodiment of a computing device 400. Computing device 400 represents a communication and data processing device including or representing (without limitations) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet based cable television set-top boxes, etc.), global positioning system (GPS)-based devices, automotive infotainment devices, etc.

In some embodiments, computing device 400 includes or works with or is embedded in or facilitates any number and type of other smart devices, such as (without limitation) autonomous machines or artificially intelligent agents, such as a mechanical agents or machines, electronics agents or machines, virtual agents or machines, electromechanical agents or machines, etc. Examples of autonomous machines or artificially intelligent agents may include (without limitation) robots, autonomous vehicles (e.g., self-driving cars, self-flying planes, self-sailing boats, etc.), autonomous equipment self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 400 may include a computer platform hosting an integrated circuit ("IC"), such as a system on a chip ("SOC" or "SOC"), integrating various hardware and/or software components of computing device 400 on a single chip.

As illustrated, in one embodiment, computing device 400 may include any number and type of hardware and/or software components, such as (without limitation) graphics processing unit ("GPU" or simply "graphics processor") 416, graphics driver (also referred to as "GPU driver", "graphics driver logic", "driver logic", user-mode driver (UMD), user-mode driver framework (UMDF), or simply "driver") 415, central processing unit ("CPU" or simply "application processor") 412, hardware accelerator 414 (such as an FPGA, ASIC, a re-purposed CPU, or a re-purposed GPU, for example), memory 408, network devices, drivers, or the like, as well as input/output (I/O) sources 404, such as touchscreens, touch panels, touch pads, virtual or regular keyboards, virtual or regular mice, ports, connectors, etc. Computing device 400 may include operating system (OS) 406 serving as an interface between hardware and/or physical resources of the computing device 400 and a user. Computing device 400 also includes a NIC 420.

It is to be appreciated that a lesser or more equipped system than the example described above may be utilized for certain implementations. Therefore, the configuration of computing device 400 may vary from implementation to implementation depending upon numerous factors, such as price constraints, performance requirements, technological improvements, or other circumstances.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The terms "logic", "module", "component", "engine", "circuitry", "element", and "mechanism" may include, by way of example, software, hardware and/or a combination thereof, such as firmware.

Computing device 400 may host network interface device(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(s). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD—ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 5:
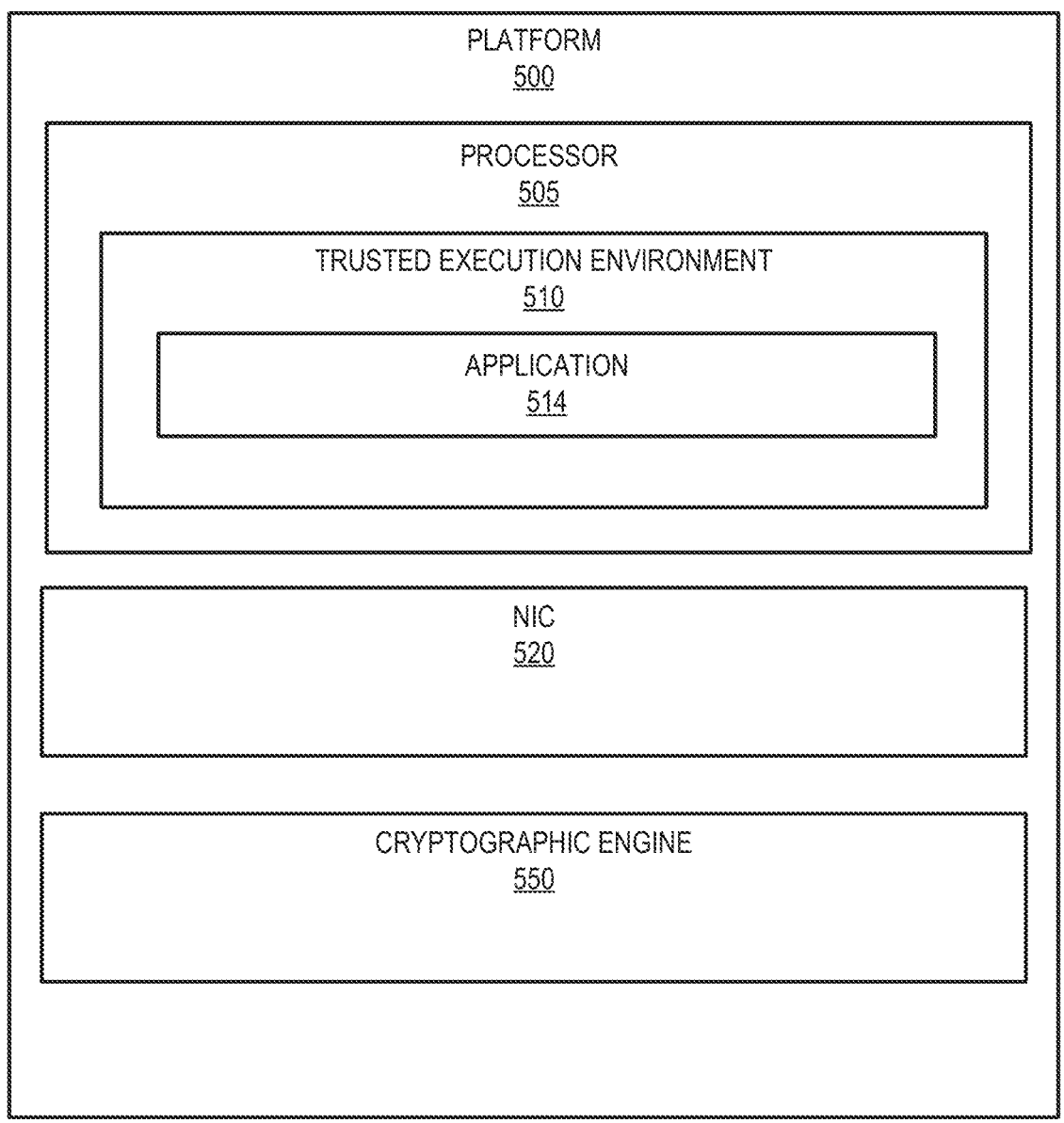
FIG. 5 illustrates one embodiment of a computing platform.

FIG. 5 illustrates a block diagram depicting one embodiment of a platform 500. In one implementation, the illustrative platform 500 may include a processor 505 to establish a TEE 510 during operation. The platform 500 may be the same as computing device 100 described with respect to FIGS. 1 and 2, and computing device 400 in FIG. 4, for example. The establishment of the TEE 510 may be in line with the discussion above with respect to FIG. 3 of establishing a TEE and such discussion applies similarly here with respect to FIG. 5.

As illustrated, the TEE 510 further includes an application 514. The various components of the platform 500 may be embodied as hardware, firmware, software, or a combination thereof. As such, in some embodiments, one or more of the components of the platform 500 may be embodied as circuitry or collection of electrical devices. Additionally, in some embodiments, one or more of the illustrative components may form a portion of another component and/or one or more of the illustrative components may be independent of one another.

The TEE 510 may be embodied as a trusted execution environment of the platform 500 that is authenticated and protected from unauthorized access using hardware support of the platform 500. The TEE 510 may also include or otherwise interface with one or more drivers, libraries, or other components of the platform 500 to interface with an accelerator.

Platform 500 also includes a NIC 520, which may be comparable to NIC 150 discussed above. In this embodiment, cryptographic engine 550 is included within platform 500. In one embodiment, cryptographic engine 550 is included within platform 500. In one embodiment, cryptographic engine 550 includes encryptor and decryptor logic that may be configured to perform a cryptographic operation associated with data transfer transactions (e.g., remote direct memory access (RDMA), Direct Memory Access (DMA), GPU, etc.).

As discussed above, maintaining the confidentiality of memory to memory data transfers in a data center is vital. Current memory data transfer security mechanisms implement software encryption/decryption and/or link encryption. For example, memory data is encrypted via a software algorithm at NIC 150 prior to being transmitted via a communication link to a destination NIC 150 where it is decrypted. However, hardware encryption of memory via cryptographic engine 550 would provide enhanced performance (e.g., latency and energy usage). To minimize cryptographic impact on transport latency, cryptographic engine 550 uses symmetric encryption (e.g., the same inputs are provided to the same cryptographic algorithm for encryption and decryption at each endpoint) to encrypt and decrypt data as it is written and read from memory on the two separate endpoints. Additionally, the same tweak must be available at both endpoints in embodiments in which cryptographic engine 550 implements tweakable block ciphers. A tweakable block cipher encrypts a message (M) under control of not only a key K but also a tweak (T) to yield a ciphertext (C).

A problem with using tweaks when transporting encrypted data is that cryptographic engine 550 uses tweaks that are platform specific (e.g., physical address). Thus, using cryptographic engine 550 tweaks for data transport creates security challenges and prohibits efficient scaling of such an encryption scheme to multiple platforms. For example, sharing physical addresses is not a good security practice as it may reveal the internal setup of the sender or receiver and could create opportunities for attacks, such as side channel attacks. Further, such sharing also induces an overhead in terms of the amount of information exchanged during setup. This is because the receiver must know the mapping of its platform specific information to the sender's platform specific information. If the information is a physical address, this means exchanging page to page mappings.

Figure 6A:
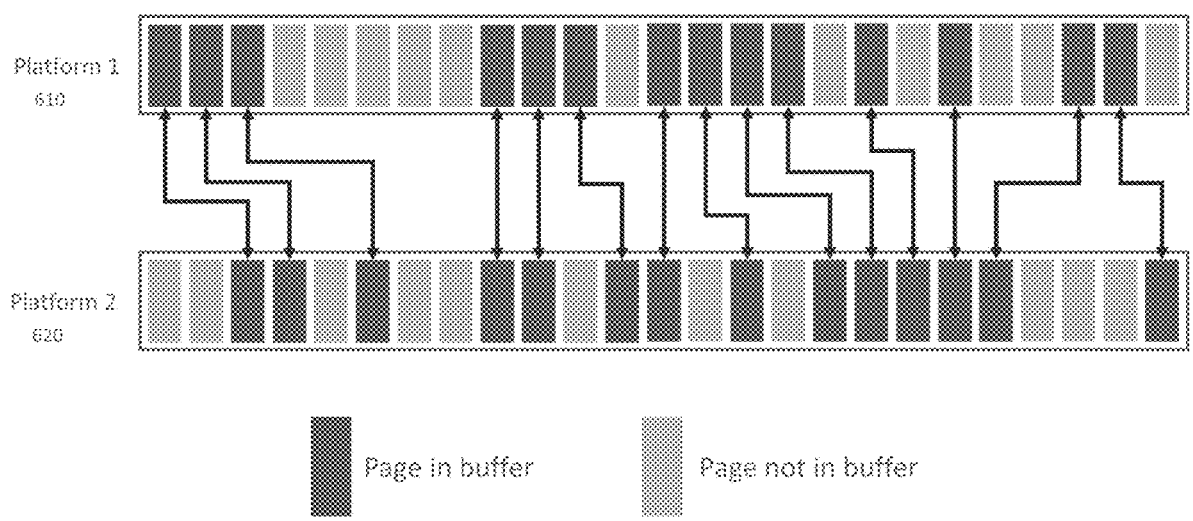
FIGS. 6A & 6B illustrate embodiments of platform buffers.

FIG. 6A illustrates one embodiment of buffers in different platforms in which there is a tweak mismatch. As shown, pages in a buffer in a first platform (Platform 1) 610 are mapped to pages in an identical size buffer in a second platform (Platform 2) 620. In order to obtain the same tweaks each page would need to be mapped from Platform 1 to Platform 2. However, mapping pages in Platform 1 to pages Platform 2 requires an overhead information transfer O(N) to translate physical page address offsets that are not secure (e.g., platform specific), where N comprises a number of pages shared.

According to one embodiment, cryptographic engine 550 exchanges tweak seeds (e.g., instead of physical/cryptographic addresses) that are used to directly generate tweaks that are stored in cryptographic engine 550. In such an embodiment, the tweaks may be pre-generated and stored (e.g., static) or dynamically generated. In a further embodiment, a cryptographic engine 550 at a sender platform generates a plurality of tweaks corresponding to each allocated page (or other platform specific information) of a buffer within memory from a single tweak seed, encrypts memory data using the plurality of tweaks and an encryption key. The encrypted memory data is then transmitted to a receiver platform.

Subsequently, a cryptographic engine 550 at the receiver platform generates the plurality of tweaks from the same tweak seed and decrypts the data encrypted memory data using the plurality of tweaks and the encryption key. In such an embodiment, a tweak seed is a number that is randomly generated to prevent repetition. In a further embodiment, the tweak seed generation scheme is known to both the sender and receiver. In yet a further embodiment, the tweaks are generated by applying the tweak seed to buffer offsets, as will be discussed in further detail below. Since the generation scheme is based on buffer offsets there is no platform specific information used, and thus may be implemented without sending platform specific mappings (e.g., page to page mappings) for both sides.

Figure 7:
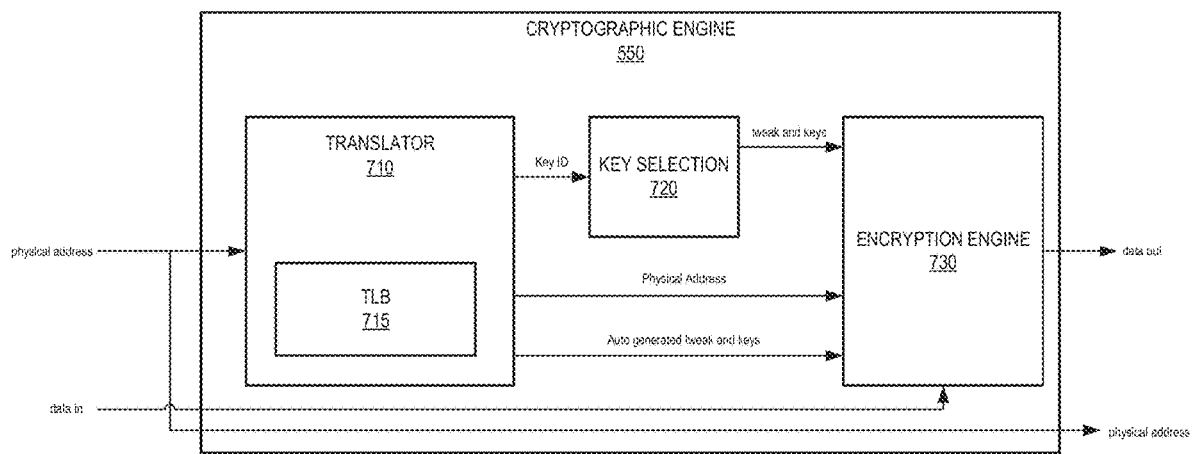
FIG. 7 illustrates one embodiment of a cryptographic engine.

FIG. 7 illustrates one embodiment of a cryptographic engine 550. As shown in FIG. 7, cryptographic engine 550 includes translator 710, key selection 720, and encryption engine 730. In one embodiment, translator 710 may operate in either a legacy mode or a transport mode. In the legacy mode, translator 710 generates a key identifier (ID) based on received platform specific information (e.g., physical address) that are forwarded to key selection 720, which generates the tweak and encryption keys that are forwarded to encryption engine 730 for encryption of the memory data using encryption keys and the physical address as the tweaks.

In the transport mode, translator 710 applies a tweak seed to buffer offsets associated with memory pages of data that is to be transferred to generate tweaks. In one embodiment, translator 710 applies the tweak seed to the buffer offsets using an algorithm (e.g., an additive tweak generation scheme) to generate the tweaks. In additive tweak generation scheme the offset is simply added to the tweak seed to generate a tweak associated with a page of memory data.

In a further embodiment, translator 710 uses a translation lookaside buffer (TLB) 715 to retrieve the offsets associated with the physical page addresses that are used to generate the tweaks. In such an embodiment, TLB 715 stores offsets associated with the physical page addresses. As a result, translator 710 receives a physical address and uses TLB 715 to select an offset associated with the physical address. Translator 710 then generates a tweak associated with the physical address by applying a tweak seed to the offset using a tweak generation algorithm. Subsequently, the tweak and an encryption key are forwarded to encryption engine 730 for encryption of data to be transferred using the tweak and an encryption key. Encryption engine 730 then transmits the encrypted memory data. In one embodiment, translator 710 mode is setup at platform runtime via a CPU instruction based on platform specific configuration.

Upon receiving the encrypted memory data at the receiving platform, the reverse process is performed. For example, translator 710 receives the physical addresses at which the encrypted data is stored in memory and determines the offsets (e.g., via TLB 715). Translator 710 then applies the tweak seed (e.g., using the same algorithm) to the offsets to generate the tweaks. Encryption engine 730 at cryptographic engine subsequently uses the tweaks and the encryption key to decrypt the data. In a further embodiment, translator 710 enables a tweak seed to be generated for each physical page. In such an embodiment, each page may be separately encrypted by applying a unique tweak seed to each page to generate a tweak associated with the page. In yet a further embodiment, a separate encryption key may also be used to encrypt each page.

Although described as being included in cryptographic engine 550, other embodiments may feature translator 710 outside of encryption engine. In such embodiment translator 710 is included within processor 505 and placed. The simplest embodiment would place the translator 710 adjacent to the encryption engine 550. In embodiments in which the processor CPU interconnect is located in between encryption engine 550 and translator 710, changes to the size of the interconnect wires be introduced, or a new type of message may be implemented on the interconnect. Such a message specifically queries translator 710 for the tweaks, or transmits a tweak together with the data in instances in which translator 710 is located at the data path (e.g., the IOMMUs or MMUs).

Figure 6B:
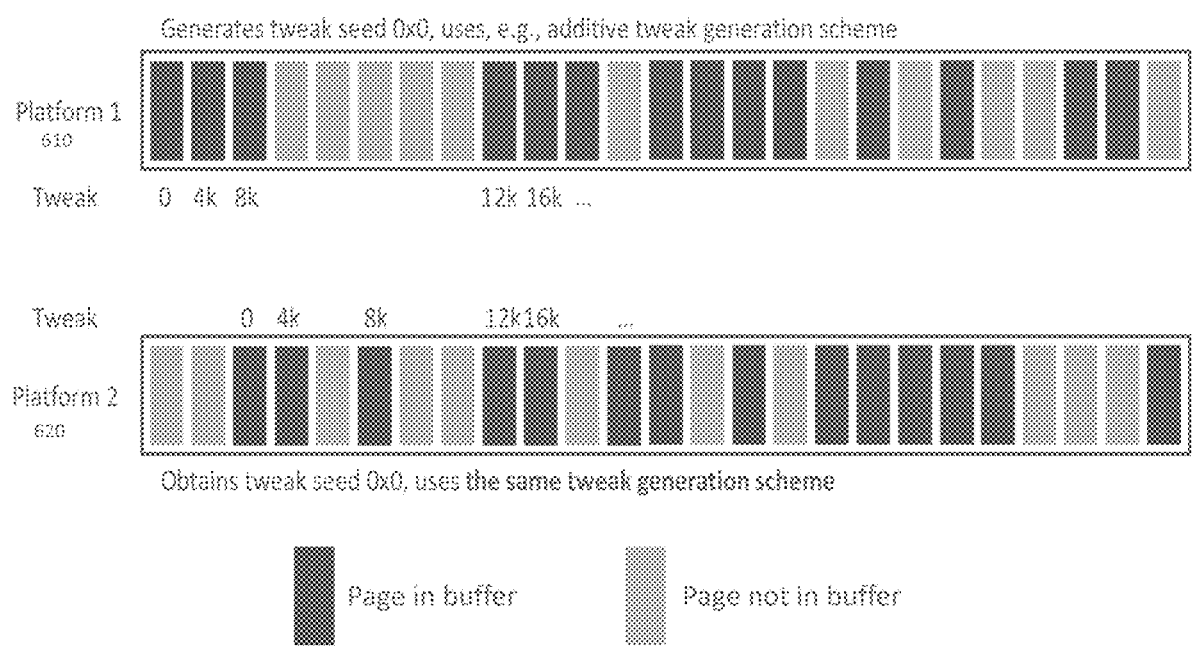

As discussed above, the tweaks are generated based on buffer offsets. FIG. 6B illustrates one embodiment of assigning offsets to pages in buffers in different platforms. As shown in FIG. 6B, an offset is generated for each page in a buffer (e.g., 0, 4 k, 8 k, 12 k, 16 k, etc.) in Platforms 1 and 2. Additionally, Platform 1 610 generates a tweak seed (e.g., 0×0), while Platform 2 620 receives the tweak seed and uses the same tweak generation scheme as Platform 1 610. In such an embodiment, a tweak is generated for the first page. Subsequently, a single page offset is added for a second page to generate a second tweak associated with the second page, and two-page offsets are added for a third page to generate a third tweak associated with the third page, etc. As a result, tweak seed translation implements overhead of only O(1) information transfer with non-platform specific information. In one embodiment, tweak seeds are generated independently. For example, a tweak seed may be a random number generated for each memory region or connection. In such an embodiment, a tweak generation routine (e.g., function F) is dependent only on the offset (o) and the tweak seed (s) (e.g., F(o, s) is defined for a specific embodiment).

Figure 8:
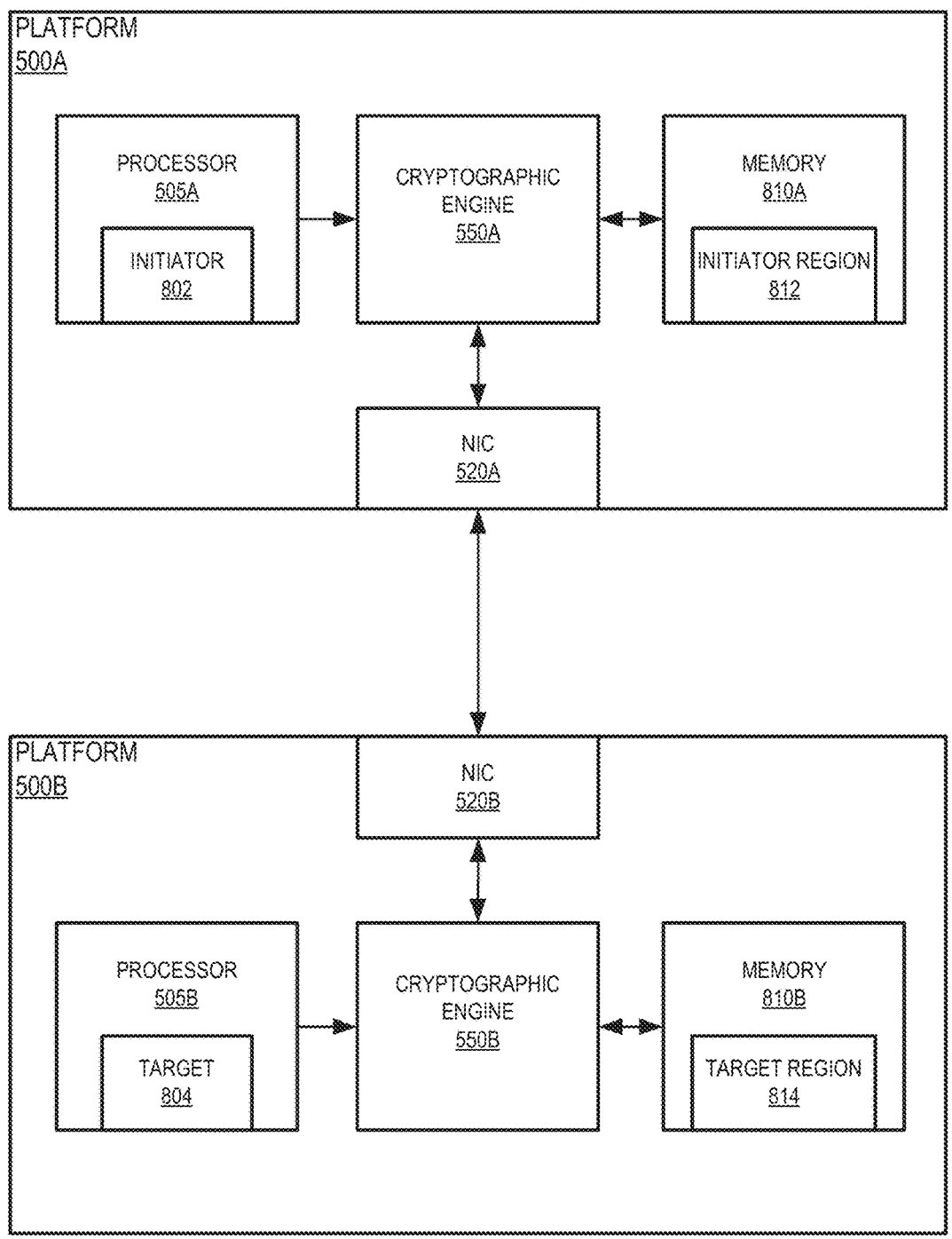
FIG. 8 illustrates one embodiment of platforms coupled to transfer data.

FIG. 8 illustrates one embodiment of platform 500 endpoints (e.g., 500A and 500B) coupled to securely transfer data. As shown in FIG. 8, each platform 500 includes a processor 505, cryptographic engine 550 including the components discussed above with reference to FIG. 7 and NIC 520, in addition to memory 810. In one embodiment, processor 505A within platform 500A includes initiator software 802 that is implemented to initiate the transfer of memory data within an initiator region 812 of memory 810A to a target region 814 of memory 810B within platform 500B for access by target software 804. In this embodiment, cryptographic engines 550A and 550B implement the same cryptographic algorithm.

Figure 9:
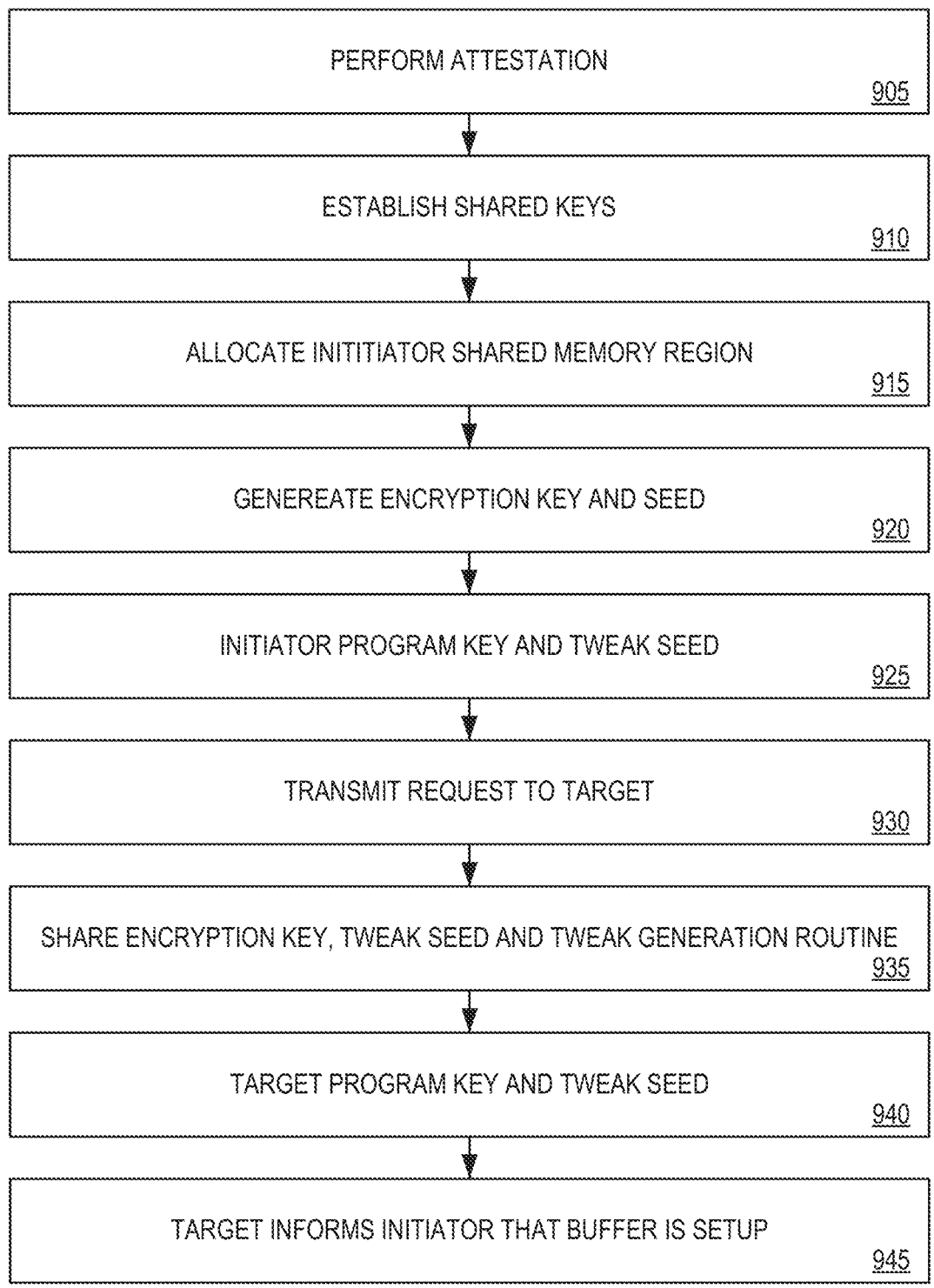
FIG. 9 is a flow diagram illustrating one embodiment of an endpoint configuration process.

Prior to data transfer platform 500 endpoints are configured to securely transfer data. FIG. 9 is a flow diagram illustrating one embodiment of an endpoint configuration process. At processing block 905, attestation is performed between initiator software 802 at platform 500A and target software 804 at platform 500B (e.g., via Security Protocol and Data Model (SPDM), SIGMA etc.). At processing block 910, shared secret keys are established between platforms 500A and 500B upon successful attestation.

At processing block 915, initiator software 802 allocates initiator region 812 within memory 810A (e.g., or initiator's shared memory region) that is to be exposed to platform 500B for direct copy. At processing block 920, the initiator generates the encryption key and a tweak seed to use for generating the cryptographic tweaks. In one embodiment, the key and tweak seed may be generated by cryptographic engine 550A, or trusted software, which maintains strong isolation enforced by processor 505. If generated by cryptographic engine 550, the trusted software is configured to securely access the key and tweak seed. If generated by trusted software, the software is configured to securely provision translator 710. The trusted software on the initiator transmits the tweak and key to the trusted software on the target over a secure channel. The trusted software on the target programs the key in cryptographic engine 550B and the tweak seed in translator 810B. In a further embodiment, the key and tweak seed are generated at each session between the sender and receiver ensuring their freshness. In a further embodiment, cryptographic engine 550A may generate a different memory encryption key than the rest of the software domain to encrypt the initiator shared memory region to reduce exposure.

At processing block 925, the encryption key and tweak seed/tweaks are programmed into cryptographic engine 550A (e.g., via some CPU instructions). In one embodiment, the initiator has a choice as to whether to use the tweak seed in cryptographic engine 550 that generates the corresponding tweaks for the initiator or generate the tweaks corresponding to each of the platform specific information (e.g., physical address pages) that the memory region entails on their own. Accordingly, the initiator can either leave the task of generating the tweaks to the encryption engine or generate them on their own. Similarly, the seed generation itself may be left to the cryptographic engine.

At processing block 930, the initiator transmits a request to the target to allocate a memory region (e.g., target region 814) to receive data. At processing block 935, the initiator shares the memory encryption key, tweak seed and tweak generation routine (or algorithm) with the target along with other standard information for data copy (e.g., buffer size, location of memory region, etc.). At processing block 940, the target uses the encryption keys and tweak seed to program cryptographic engine 550B. Similar to discussed above, the target has a choice (e.g., subject to initiator limitations) whether to use the tweak generation routine within the memory encryption engine or conduct the tweak generation locally. At processing block 945, the target informs the initiator that target region 814 is setup and ready to receive data after which the initiator is ready to perform the transfer.

Figure 10:
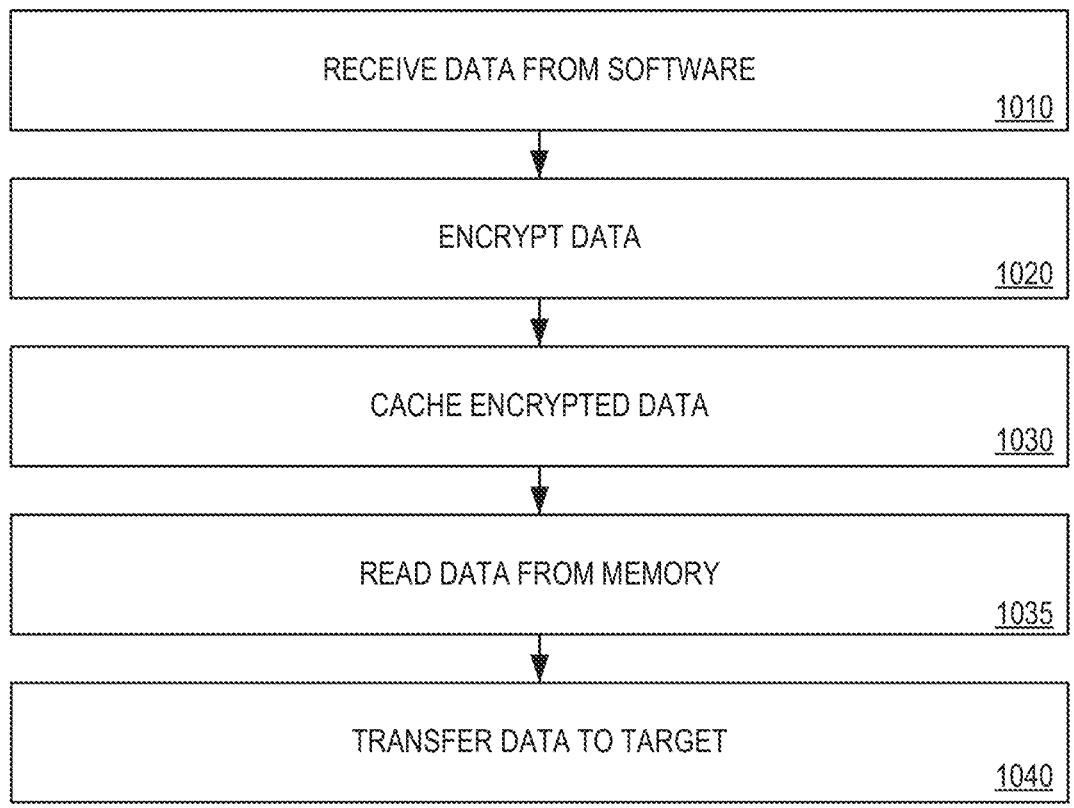
FIG. 10 is a flow diagram illustrating one embodiment of an initiator data transfer process.

FIG. 10 is a flow diagram illustrating one embodiment of a process performed by the initiator to transfer data to the target. At processing block 1010, data to be shared is transferred from initiator software 802 to cryptographic engine 550A. At processing block 1020, cryptographic engine 550A encrypts the data to generate encrypted data. At processing block 1030, cryptographic engine 550A stores (or caches) the encrypted data at initiator region 812 within memory 810A. Sometime later the encrypted data is to be transferred to the target platform 500B. At such time, cryptographic engine 550A reads the encrypted data from initiator region 812, processing block 1035. At processing block 1040, cryptographic engine 550A transmits the encrypted data to target platform 500B via NIC 520A. In one embodiment, the encrypted data is read from initiator region 812 by NIC 520A using a special key ID, recognized by cryptographic engine 550A, that is responsible for I/O side transfer (e.g., not to decrypt or encrypt the data).

Figure 11:
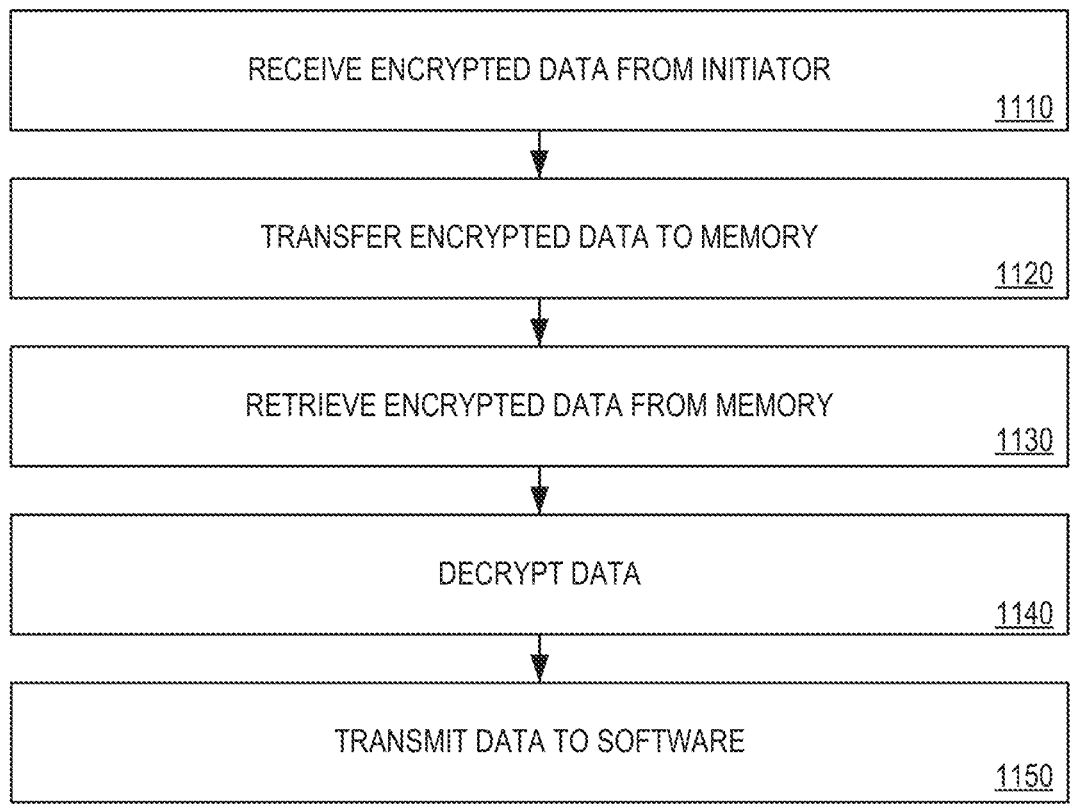
FIG. 11 is a flow diagram illustrating one embodiment of a target data transfer process.

FIG. 11 is a flow diagram illustrating one embodiment of a process performed by the target to receive data from the initiator. At processing block 1110, the encrypted data is received at target platform 500B from initiator platform 500A via NIC 520B. At processing block 1120, the encrypted data is transferred to target region 814 within memory 810B via cryptographic engine 550B. At processing block 1130, cryptographic engine 550B retrieves the encrypted data from target region 814. At processing block 1140, cryptographic engine 550B decrypts the data. At processing block 1150, cryptographic engine 550A transfers the data to processor 505B for use by target software 804.

The above described mechanism performs translation without exchanging sensitive information (e.g., platform specific) of the receiver or the sender. Additionally, the translation engine allows for an encryption key and tweak per buffer page rather than key per process/VM, thus increasing isolation. Moreover, the mechanism enables confidentiality and integrity of memory sharing between platforms in a standard OS security model or in a confidential computing model (e.g., security in the TCB boundary and virtualization is outside of the TCB boundary).

Illustrative examples of the technologies disclosed herein are provided below. An embodiment of the technologies may include any one or more, and any combination of, the examples described below.

Example 1 includes an apparatus comprising a cryptographic processor comprising translator circuitry to receive a plurality of physical addresses of memory data, determine an offset associated with each of the physical page addresses and apply a tweak seed to each offset to generate a plurality of tweaks and encryption circuitry to receive the plurality of tweaks and generate encrypted memory data using an encryption key and the plurality of tweaks.

Example 2 includes the subject matter of Example 1, further comprising a memory to store the encrypted memory data.

Example 3 includes the subject matter of any of Examples 1-2, further comprising a network interface to transmit the encrypted memory data to a target platform.

Example 4 includes the subject matter of any of Examples 1-3, wherein the translator circuitry determines the offsets via a translation lookaside buffer that stores offsets associated with the physical page addresses.

Example 5 includes the subject matter of any of Examples 1-4, wherein the translator circuitry applies the tweak seed to the offsets using an algorithm.

Example 6 includes the subject matter of any of Examples 1-5, wherein the algorithm comprises an additive tweak generation algorithm.

Example 7 includes an apparatus comprising translator circuitry to determine an offset associated with each of a plurality of physical page addresses of encrypted memory data and apply a tweak seed to each offset to generate a plurality of tweaks and encryption circuitry to receive the encrypted memory data and decrypt the encrypted memory data using an encryption key and the plurality of tweaks.

Example 8 includes the subject matter of Example 7, further comprising a network interface to receive the encrypted memory data from an initiator platform.

Example 9 includes the subject matter of any of Examples 7-8, further comprising a memory to store the received encrypted memory data.

Example 10 includes the subject matter of any of Examples 7-9, wherein the translator circuitry determines the physical page addresses via a translation lookaside buffer that stores offsets associated with the physical page addresses.

Example 11 includes the subject matter of any of Examples 7-10, wherein the translator circuitry applies the tweak seed to the offsets using an algorithm.

Example 12 includes the subject matter of any of Examples 7-11, wherein the algorithm comprises an additive tweak generation algorithm.

Example 13 includes a method comprising receiving a plurality of physical addresses of memory data, determining an offset associated with each of the physical page addresses, applying a tweak seed to each offset to generate a plurality of tweaks and generating encrypted memory data using an encryption key and the plurality of tweaks.

Example 14 includes the subject matter of Example 13, wherein determining the offsets comprises searching a translation lookaside buffer using the physical page addresses to find the offsets.

Example 15 includes the subject matter of any of Examples 13-14, further comprising storing the encrypted memory data.

Example 16 includes the subject matter of any of Examples 12-14, further comprising retrieving the stored encrypted memory data and transmitting the encrypted memory data to a target platform.

Example 17 includes at least one computer readable medium having instructions stored thereon, which when executed by one or more processors, cause the processors determine an offset associated with each of a plurality of physical page addresses of encrypted memory data, apply a tweak seed to each offset to generate a plurality of tweaks and decrypt the encrypted memory data using an encryption key and the plurality of tweaks.

Example 18 includes the subject matter of Example 17, wherein determining the offsets comprises searching a translation lookaside buffer using the physical page addresses to find the offsets.

Example 19 includes the subject matter of any of Examples 17-18, having instructions stored thereon, which when executed by one or more processors, further cause the processors to receive the encrypted memory data from an initiator platform.

Example 20 includes the subject matter of any of Examples 17-19, having instructions stored thereon, which when executed by one or more processors, further cause the processors to store the encrypted memory data.

Example 21 includes at least one computer readable medium having instructions stored thereon, which when executed by one or more processors, cause the processors to receive a plurality of physical addresses of memory data, determine an offset associated with each of the plurality of physical page addresses, apply a tweak seed to each offset to generate a plurality of tweaks; and generate encrypted memory data using an encryption key and the plurality of tweaks Example 22 includes the subject matter of Example 21, wherein determining the offsets comprises searching a translation lookaside buffer using the physical page addresses to find the offsets.

Example 23 includes the subject matter of any of Examples 21-22, having instructions stored thereon, which when executed by one or more processors, further cause the processors to store the encrypted memory data.

Example 24 includes the subject matter of any of Examples 21-23, having instructions stored thereon, which when executed by one or more processors, further cause the processors to retrieve the stored encrypted memory data and transmit the encrypted memory data to a target platform.

Example 25 includes a system comprising a memory device comprising memory data and a cryptographic circuitry, including translator circuitry to receive a plurality of physical addresses of the memory data, determine an offset associated with each of the plurality of physical page addresses and apply a tweak seed to each offset to generate a plurality of tweaks.

Example 26 includes the subject matter of Example 25, wherein the cryptographic circuitry further comprises encryption circuitry to receive the plurality of tweaks and apply an encryption key and the plurality of tweaks to the memory data to generate encrypted memory data.

Example 27 includes the subject matter of any of Examples 25-26, wherein the cryptographic circuitry further comprises translator circuitry to determine the offsets via a translation lookaside buffer that stores offsets associated with the physical page addresses.

Example 28 includes the subject matter of any of Examples 25-27, further comprising a network interface to transmit the encrypted memory data to a target platform.

Example 29 includes the subject matter of any of Examples 25-28, wherein the translator circuitry applies the tweak seed to the offsets using an additive tweak generation algorithm.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition, "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising translator circuitry to receive a plurality of physical addresses of memory data, determine an offset associated with each of the plurality of physical page addresses and apply a tweak seed to each offset to generate a plurality of tweaks.

2. The apparatus of claim 1, further comprising encryption circuitry to receive the plurality of tweaks and generate encrypted memory data using an encryption key and the plurality of tweaks.

3. The apparatus of claim 2, further comprising a memory to store the encrypted memory data.

4. The apparatus of claim 3, further comprising a network interface to transmit the encrypted memory data to a target platform.

5. The apparatus of claim 2, wherein the translator circuitry determines the offsets via a translation lookaside buffer that stores offsets associated with the physical page addresses.

6. The apparatus of claim 1, wherein the translator circuitry applies the tweak seed to the offsets using an algorithm.

7. The apparatus of claim 6, wherein the algorithm comprises an additive tweak generation algorithm.

8. A method comprising:
receiving a plurality of physical addresses of memory data;
determining an offset associated with each of the plurality of physical page addresses;
applying a tweak seed to each offset to generate a plurality of tweaks; and
generating encrypted memory data using an encryption key and the plurality of tweaks.

9. The method of claim 8, wherein determining the offsets comprises searching a translation lookaside buffer using the physical page addresses to find the offsets.

10. The method of claim 9, further comprising storing the encrypted memory data.

11. The method of claim 10, further comprising:
retrieving the stored encrypted memory data; and
transmitting the encrypted memory data to a target platform.

12. At least one non-transitory computer readable medium having instructions stored thereon, which when executed by one or more processors, cause the processors to:
receive a plurality of physical addresses of memory data;
determine an offset associated with each of the plurality of physical page addresses;
apply a tweak seed to each offset to generate a plurality of tweaks; and
generate encrypted memory data using an encryption key and the plurality of tweaks.

13. The computer readable medium of claim 12, wherein determining the offsets comprises searching a translation lookaside buffer using the physical page addresses to find the offsets.

14. The computer readable medium of claim 13, having instructions stored thereon, which when executed by one or more processors, further cause the processors to store the encrypted memory data.

15. The computer readable medium of claim 14, having instructions stored thereon, which when executed by one or more processors, further cause the processors to:
retrieve the stored encrypted memory data; and
transmit the encrypted memory data to a target platform.

16. A system comprising:
a memory device comprising memory data; and
cryptographic circuitry, including:
translator circuitry to receive a plurality of physical addresses of the memory data, determine an offset associated with each of the plurality of physical page addresses and apply a tweak seed to each offset to generate a plurality of tweaks.

17. The system of claim 16, wherein the cryptographic circuitry further comprises encryption circuitry to receive the plurality of tweaks and apply an encryption key and the plurality of tweaks to the memory data to generate encrypted memory data.

18. The system of claim 17, wherein the cryptographic circuitry further comprises translator circuitry to determine the offsets via a translation lookaside buffer that stores offsets associated with the physical page addresses.

19. The system of claim 18, further comprising a network interface to transmit the encrypted memory data to a target platform.

20. The system of claim 16, wherein the translator circuitry applies the tweak seed to the offsets using an additive tweak generation algorithm.

* * * * *